(12) United States Patent
Claus et al.

(10) Patent No.: US 7,711,640 B2
(45) Date of Patent: *May 4, 2010

(54) METHODS AND APPARATUS FOR COMPOSITE TRADING ORDER PROCESSING

(75) Inventors: Matthew W. Claus, Summit, NJ (US); James R. Driscoll, New York, NY (US); Gregory P. Manning, New York, NY (US); Joseph C. Noviello, New York, NY (US)

(73) Assignee: BGC Partners, Inc., New York, NY (US)

( * ) Notice: Subject to any disclaimer, the term of this patent is extended or adjusted under 35 U.S.C. 154(b) by 794 days.

This patent is subject to a terminal disclaimer.

(21) Appl. No.: 11/399,112

(22) Filed: Apr. 5, 2006

(65) Prior Publication Data

US 2007/0143204 A1   Jun. 21, 2007

Related U.S. Application Data

(60) Provisional application No. 60/753,095, filed on Dec. 20, 2005.

(51) Int. Cl.
*G06Q 40/00* (2006.01)
(52) U.S. Cl. .......................................... 705/39; 705/37
(58) Field of Classification Search .............. 705/35–45
See application file for complete search history.

(56) References Cited

U.S. PATENT DOCUMENTS 3,573,747 A    4/1971   Adams et al.

| | | |
|---|---|---|
| 4,903,201 A | 2/1990 | Wagner |
| 5,077,665 A | 12/1991 | Silverman et al. |
| 5,126,936 A | 6/1992 | Champion et al. .......... 364/408 |
| 5,161,103 A | 11/1992 | Kosaka et al. |
| 5,297,031 A | 3/1994 | Gutterman et al. |
| 5,500,793 A | 3/1996 | Deming, Jr. et al. |
| 5,717,989 A | 2/1998 | Tozzoli et al. |
| 5,727,165 A | 3/1998 | Ordish et al. |
| 5,787,402 A | 7/1998 | Potter et al. |

(Continued)

FOREIGN PATENT DOCUMENTS

EP    0401203    12/1990

(Continued)

OTHER PUBLICATIONS

*Notification of Transmittal of the International Search Report and the Written Opinion of the International Searching Authority* for International Application No. PCT/US06/48328; 8 pages, Sep. 24, 2007.

(Continued)

*Primary Examiner*—James Kramer
*Assistant Examiner*—Rajesh Khattar

(57) ABSTRACT

An apparatus for processing a composite trading order comprises an interface operable to display a composite value representing a weighted quantity of a plurality of trading products. The apparatus further comprises a processor operable to receive at least one input representing a composite trading order, wherein the at least one input comprises a quantity that is equal to at least a portion of the weighted quantity. The at least one input is usable to generate one or more constituent trading orders that, when filled, combine to satisfy the composite trading order.

124 Claims, 4 Drawing Sheets

U.S. PATENT DOCUMENTS

| | | | |
|---|---|---|---|
| 5,809,483 | A | 9/1998 | Broka et al. |
| 5,845,266 | A | 12/1998 | Lupien et al. |
| 5,857,176 | A | 1/1999 | Ginsberg |
| 5,905,974 | A | 5/1999 | Fraser et al. |
| 5,924,082 | A | 7/1999 | Silverman et al. |
| 5,950,176 | A | 9/1999 | Keiser et al. |
| 6,021,397 | A | 2/2000 | Jones et al. |
| 6,035,287 | A | 3/2000 | Stallaert et al. ............... 705/37 |
| 6,112,189 | A | 8/2000 | Rickard et al. |
| 6,134,535 | A | 10/2000 | Belzberg |
| 6,278,982 | B1 | 8/2001 | Korhammer et al. |
| 6,343,278 | B1 | 1/2002 | Jain et al. |
| 6,408,282 | B1 | 6/2002 | Buist |
| 6,418,418 | B1 | 7/2002 | Nakamura et al. |
| 6,418,419 | B1 | 7/2002 | Nieboer et al. |
| 6,519,574 | B1 | 2/2003 | Wilton et al. |
| 6,601,044 | B1 | 7/2003 | Wallman ..................... 705/36 |
| 6,839,685 | B1 | 1/2005 | Leistensnider et al. ........ 705/36 |
| 6,947,901 | B1 | 9/2005 | McCabe et al. ............... 705/26 |
| 6,996,539 | B1 | 2/2006 | Wallman ..................... 705/36 |
| 7,039,610 | B2 | 5/2006 | Morano et al. ................ 705/37 |
| 7,092,919 | B2 | 8/2006 | Bergenudd .................. 705/400 |
| 7,107,229 | B1 | 9/2006 | Sullivan ...................... 705/26 |
| 7,117,176 | B2 | 10/2006 | Wallman ..................... 705/36 |
| 7,155,410 | B1 | 12/2006 | Woodmansey et al. |
| 7,333,952 | B1 | 2/2008 | Neyman et al. |
| 2001/0042785 | A1 | 11/2001 | Walker et al. |
| 2002/0004776 | A1 | 1/2002 | Gladstone ..................... 705/37 |
| 2002/0065752 | A1 | 5/2002 | Lewis |
| 2002/0107781 | A1 | 8/2002 | Neyman et al. ............... 705/37 |
| 2002/0169703 | A1 | 11/2002 | Lutnick et al. ................ 705/37 |
| 2002/0174047 | A1 | 11/2002 | Fernholz ...................... 705/36 |
| 2003/0144944 | A1 | 7/2003 | Kalt et al. ..................... 705/37 |
| 2003/0154153 | A1 | 8/2003 | Steidlmayer et al. .......... 705/37 |
| 2003/0212621 | A1 | 11/2003 | Poulter et al. ................. 705/36 |
| 2004/0002913 | A1 | 1/2004 | Breen et al. ................... 705/37 |
| 2004/0019553 | A1 | 1/2004 | Setz et al. ..................... 705/37 |
| 2004/0117285 | A1 | 6/2004 | Kohler ......................... 705/36 |
| 2004/0117302 | A1 | 6/2004 | Weichert et al. |
| 2004/0143537 | A1 | 7/2004 | Romani ....................... 705/37 |
| 2004/0143538 | A1 | 7/2004 | Korhammer et al. .......... 705/37 |
| 2004/0177026 | A1 | 9/2004 | Balabon ....................... 705/37 |
| 2004/0236669 | A1 | 11/2004 | Horst et al. ................... 705/37 |
| 2005/0049954 | A1 | 3/2005 | Graham et al. ................ 705/36 |
| 2005/0075963 | A1 | 4/2005 | Balabon ....................... 705/36 |
| 2005/0160024 | A1 | 7/2005 | Soderborg et al. ............ 705/37 |
| 2005/0165670 | A1 | 7/2005 | Woodmansey et al. |
| 2006/0015436 | A1 | 1/2006 | Burns et al. ................... 705/37 |
| 2006/0161498 | A1 | 7/2006 | Morano et al. ................ 705/37 |
| 2006/0195386 | A1 | 8/2006 | Glodjo et al. ................. 705/37 |
| 2007/0143203 | A1 | 6/2007 | Claus et al. |

FOREIGN PATENT DOCUMENTS

| | | |
|---|---|---|
| EP | 0873549 | 10/1998 |
| GB | 2365185 | 2/2002 |
| WO | WO 98/28900 | 7/1998 |
| WO | WO 98/49639 | 11/1998 |
| WO | WO 99/26173 | 5/1999 |
| WO | WO 99/27476 | 6/1999 |
| WO | WO 99/46658 | 9/1999 |
| WO | WO 00/03342 | 1/2000 |
| WO | WO 00/08578 | 2/2000 |
| WO | WO 00/21013 | 4/2000 |
| WO | WO 00/39719 | 7/2000 |
| WO | WO 2005/055004 A2 | 6/2005 |

OTHER PUBLICATIONS

*PCT Notification of Transmittal of the International Search Report and the Written Opinion of the International Searching Authority* for International Application No. PCT/US06/48391; 7 pages.

Patent Pending U.S. Appl. No. 11/399,019, entitled *System and Method for Processing Composite Trading Orders* by Matthew W. Claus, et al.,40 pages plus 4 pages of drawings, filed Apr. 5, 2006.

International Preliminary Report on Patentability for International Application No. PCT/US06/48328; dated Jul. 8, 2008 (4 pages).

International Preliminary Report on Patentability for International Application No. PCT/US06/48391; dated Oct. 16, 2008 (5 pages).

USPTO Office Action for Application No. 11/399,019, Apr. 2, 2009 (7 pages).

Australian Examiner's Report for AU Application No. 2006252168, dated Sep. 30, 2009 (1 page).

Australian Examiner's Report for AU Application No. 2006252169, dated Oct. 7, 2009 (2 pages).

USPTO Office Action for U.S. Appl. No. 09/627,705, filed Dec. 5, 2002 (6 pages).

USPTO Office Action for U.S. Appl. No. 09/627,705, filed Apr. 8, 2003 (6 pages).

USPTO Office Action for U.S. Appl. No. 09/627,705, filed Nov. 5, 2003 (7 pages).

USPTO Office Action for U.S. Appl. No. 09/627,705, filed Sep. 14, 2004 (5 pages).

USPTO Office Action for U.S. Appl. No. 09/627,705, filed Jul. 26, 2005 (7 pages).

USPTO Examiner's Interview Summary for U.S. Appl. No. 09/627,705, filed Aug. 16, 2004 (3 pages).

USPTO Examiner's Interview Summary for U.S. Appl. No. 09/627,705, filed Jan. 20, 2006 (3 pages).

USPTO Notice of Allowance for U.S. Appl. No. 09/627,705, mailed May 4, 2006 (14 pages).

USPTO Notice of Allowance for U.S. Appl. No. 09/627,705, mailed Sep. 22, 2006 (14 pages).

USPTO Office Action for U.S. Appl. No. 11/084,547, filed Sep. 6, 2006 (7 pages).

USPTO Office Action for U.S. Appl. No. 11/084,547, filed Jun. 27, 2007 (12 pages).

USPTO Office Action for U.S. Appl. No. 11/084,547, filed Oct. 3, 2007 (3 pages).

USPTO Examiner's Answer to Appeal Brief for U.S. Appl. No. 11/084,547, filed Sep. 15, 2008 (19 pages).

Canadian Office Action for Application No. 2380848, mailed Sep. 30, 2008, 2 pp.

International Preliminary Examination Report for PCT Application No. PCT/US00/21098, dated Dec. 28, 2001, 4 pp.

U.S. Appl. No. 60/146,971, filed Aug. 3, 1999, 25 pp.

U.S. Appl. No. 09/627,705, filed Jul. 28, 2000, 33 pp.

U.S. Appl. No. 11/084,547, filed Mar. 18, 2005, 44 pp.

U.S. Appl. No. 12/615,079, filed Nov. 9, 2009, 28 pp.

U.S. Appl. No. 60/753,095, filed Dec. 20, 2005 (36 pages).

USPTO Notice of Allowance and Fees Due and Examiner Interview Summary for Appl. No. 11/399,019, Dec. 11, 2009 (38 pages).

USPTO Office Action for Appl. No. 11/084,547, Mar. 4, 2010 (10 pages).

| Market Data - Treasury Bonds | | | | | |
|---|---|---|---|---|---|
| | Two-year | Three-year | Five-year | Ten-year |
| Price | 99.256 | 100.022 | 100.036 | 100.17 |
| Yield | 4.355 | 4.348 | 4.349 | 4.433 |
| Quantity Available for Trade | $7,000,000 | $9,000,000 | $9,000,000 | $6,000,000 |
| Coupon | 4.250 | 4.375 | 4.375 | 4.5 |
| Maturity | 11/2007 | 11/2008 | 11/2010 | 11/2015 |

METHODS AND APPARATUS FOR COMPOSITE TRADING ORDER PROCESSING

RELATED APPLICATION

This application claims priority under 35 U.S.C. §119 of provisional application Ser. No. 60/753,095, filed Dec. 20, 2005.

TECHNICAL FIELD OF THE INVENTION

The present invention relates generally to electronic trading and more specifically to a system and method for generating and displaying composite values and receiving and executing composite trading orders.

BACKGROUND OF THE INVENTION

In recent years, electronic trading systems have gained widespread acceptance for trading of a wide variety of items, such as goods, services, financial instruments, and commodities. For example, electronic trading systems have been created which facilitate the trading of financial instruments and commodities such as stocks, fixed income securities including notes and bonds, currencies, futures contracts, oil, and gold.

Many of these electronic trading systems allow traders to submit trading orders for particular trading products to market centers. Using trading orders, traders typically deal in one trading product and in one market center at a time. However, financial markets and trading strategies have evolved so that traders find it more beneficial to trade subject to strategies that may call for trades that deal in more than one trading product and more than one market center. Sometimes, there may be insufficient liquidity in the market centers to fill a particular trading order for a particular trading product or group of trading products, and the information that must be processed to identify optimal trading opportunities may be so extensive as to delay or inhibit the execution of the trading strategy. Such situations may prevent a trader from executing the desired trading order or series of trading orders. In addition, such situations may cause a trader to be left with an unfilled or partially filled trading order. That trader may subsequently attempt to identify alternative trading products and/or market centers where there is sufficient liquidity. To identify alternative trading products and/or market centers, a trader may be required to track multiple different trading products and market centers and the relationships among those trading products and market centers. Such a process may be time consuming and cause a trader to miss opportunities for making beneficial trades.

SUMMARY OF THE INVENTION

In accordance with the present invention, the disadvantages and problems associated with prior electronic trading systems have been substantially reduced or eliminated.

An apparatus for processing a composite trading order comprises an interface operable to display a composite value representing a weighted quantity of a plurality of trading products. The apparatus further comprises a processor operable to receive at least one input representing a composite trading order, wherein the at least one input comprises a quantity that is equal to at least a portion of the weighted quantity. The at least one input is usable to generate one or more constituent trading orders that, when filled, combine to satisfy the composite trading order.

Various embodiments of the present invention may benefit from numerous advantages. It should be noted that one or more embodiments may benefit from some, none, or all of the advantages discussed below. One advantage of the present invention is the display of a single composite value representing multiple trading products in various market centers. A trader may use the composite value to submit, in a single action, a composite trading order based on related trading products according to the specifications and preferences input by the trader. Using the composite trading order, the present invention may automatically generate multiple constituent trading orders in order to aggress, substantially simultaneously, across liquidity pools of related trading products. Accordingly, the system may save a trader the time and calculations involved in separately preparing and inputting trading orders for related trading products. As another advantage, because the constituent trading orders are derived from and allocated according to specifications and preferences that underlie the composite trading order, the system will substantially simultaneously identify the liquidity pools and appropriate weightings among trading products and market centers such that there is likely to be sufficient liquidity in the market centers to quickly fill the constituent trading orders. It is therefore advantageous to present a single composite value that represents the financial impact of a chosen trading strategy across all related trading products and market centers, and to permit the trader to deal on the composite value with a single action such as a composite order wherein the trading system allocates constituent trading orders among trading products and market centers subject to known mathematical relationships amongst them, and within limits and tolerances specified by the user.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
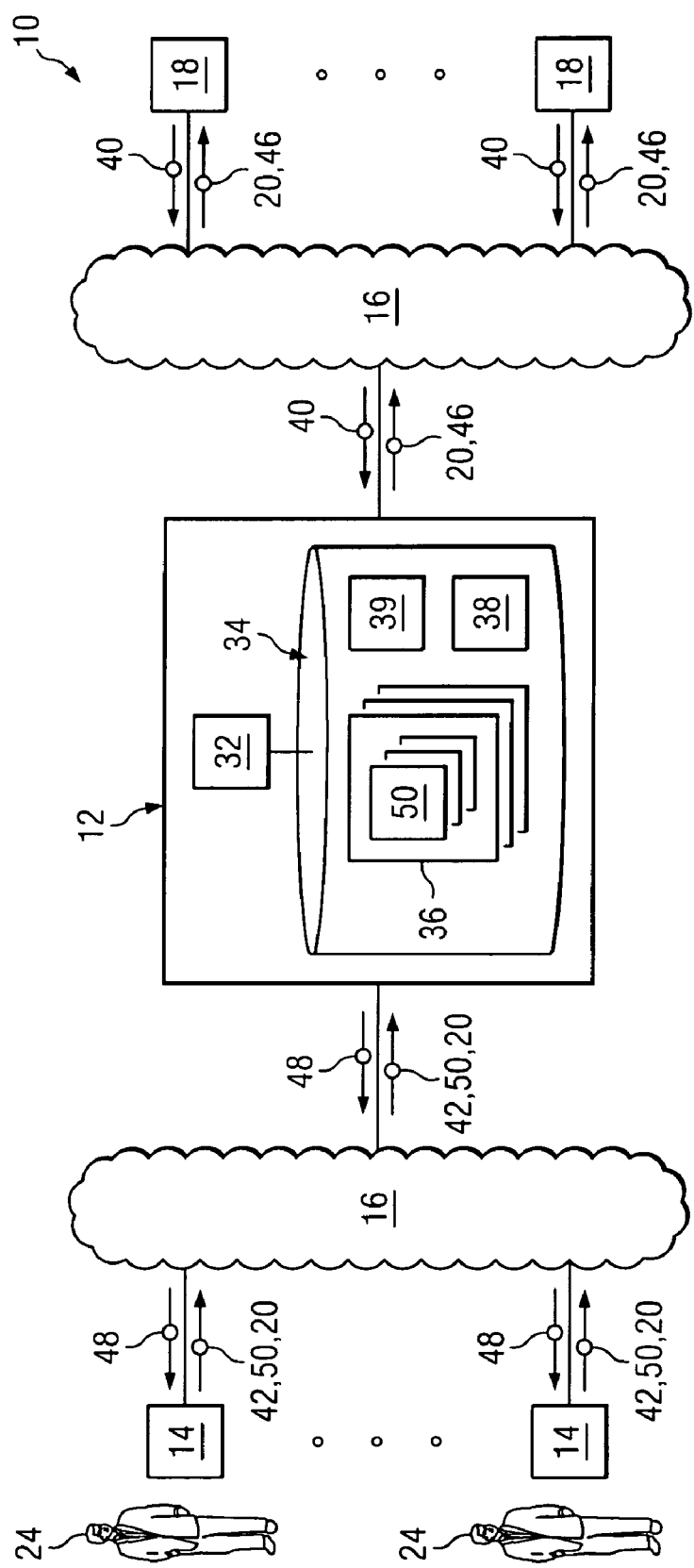
FIG. 1 illustrates one embodiment of a trading system in accordance with the present invention.

FIG. 1 illustrates one embodiment of a trading system 10 comprising a trading platform 12 coupled to clients 14 and market centers 18 via networks 16. Generally, trading system 10 is operable to receive and execute trading orders 20 from traders 24. Using at least market data 40, system 10 is operable to generate and display a composite value 48 representing relationships among and the liquidity of multiple trading products. With a single input, a particular trader 24 may use composite value 48 to submit a composite trading order 42. Composite trading order 42 may be configured according to trader preferences 50 and may be based on any suitable number and combination of trading products. It should be noted that in certain cases composite trading order 42 may be automatically configured to take the form of a particular trading order 20 for a single trading product. However, if there is insufficient liquidity in market centers 18 to fill a particular trading order 20, then composite trading order 42 may automatically aggress, substantially simultaneously, related trading products in multiple market centers 18. Thus, composite trading orders 42 may facilitate trading despite the insufficiency of a particular liquidity pool to fill a particular trading order 20 for a particular trading product. By facilitating such trading, system 10 may increase liquidity in the marketplace.

Notably, the use of composite trading orders 42 may benefit trader 24. With a single input, trader 24 may use composite trading order 42 to aggress across liquidity pools of multiple trading products. Upon receiving a single input from trader 24, system 10 may generate multiple constituent trading orders 46 based on the related trading products underlying composite trading order 42. Constituent trading orders 46 may be transmitted substantially simultaneously to any number and combination of market centers 18 for execution. Thus, system 10 may save trader 24 the time and effort involved in preparing and submitting to different market centers 18 multiple trading orders 20 for related trading products.

Each individual constituent trading order 46 can be understood as an individual trading order 20, such as an order to buy or sell a particular quantity of a particular trading product. Trading order 20 may be associated with a target price (e.g., target bid price and/or target offer price) for the trading product. The trading product that forms the basis of a given trading order 20 may comprise any type of goods, services, financial instruments, commodities, equities, stocks, fixed income securities, interest rate derivatives, currencies, futures contracts, debentures, options, securities, derivative trading instruments, and any other suitable product or combination of products.

System 10 is generally operable to identify relationships between trading products. Trading products may be related in a number of ways. For example, the historical performance of a ten-year note issued by entity X may be correlated to that of a five-year note issued by entity X. Although they are different trading products, the ten-year note and the five-year note share the same issuing entity and are correlated in their performance trends. Thus, a trader 24 who is interested in trading ten-year notes issued by entity X may also be interested in trading five-year notes issued by entity X. In addition, a weighted composite of five-year, three-year, and two-year notes issued by entity X may be substantially the same in performance and cost as a number of ten-year notes for purposes of a given trade or series of trades. As another example of related trading products, currency futures contracts for different expiration dates and different currencies may have similar performance trends. Although fixed income securities, foreign exchange, and financial and currency futures contracts are described herein, it will be understood that there may be any number, combinations, and types of related trading products.

System 10 is operable to use current market data to determine a quantity of a particular trading product that may be equivalent to a quantity of a related trading product. For example, system 10 may calculate how many five-year notes are equivalent to a number of ten-year notes. Such a calculation may be based on any suitable number and combination of factors such as, for example, the coupons, frequencies, face values, prices, and maturity dates of five-year and ten-year notes. Using current market data, system 10 may determine the relationships among trading products at any given time.

System 10 is further operable to determine the liquidity associated with particular trading products. The liquidity associated with a trading product refers to the volume of trading product available for trade in market centers 18. The available volume of trading product in market centers 18 may be referred to as a liquidity pool 70. At any given time, system 10 may determine the available volume of a particular trading product in market centers 18.

Using at least market data 40, system 10 may generate a composite value 48. Composite value 48 may be a single value that encompasses the relationships among and the liquidity of multiple trading products in multiple market centers 18. In particular, composite value 48 may represent a quantity, size, or any other measurement of one or more related products that are available for trade in various market centers 18 at any given time. In this respect, composite value 48 comprises an aggregate value that may be aggressed by a single order. Composite value 48 may be based on any suitable mathematical calculations and/or models for determining relationships among trading products. As an example, composite value 48 may be configured to represent a quantity of "10-year equivalent" fixed income securities available for trade in market centers 18. The quantity of 10-year equivalent securities may encompass the total number of available 10-year notes as well as a weighted quantity of 2-year notes, 3-year notes, 5-year notes, and/or any other suitable number and combination of related trading products. The weighted quantity of related trading products (e.g., 2-year notes, 3-year notes, 5-year notes, etc.) may be incorporated into composite value 48 because that weighted quantity may be considered substantially equivalent (e.g., in performance, yield, price sensitivity to movements in a yield curve, and/or any other suitable number and combination of characteristics) to 10-year notes.

System 10 may display composite value 48 to trader 24, who may use composite value 48 to submit, in one action, a composite trading order 42. System 10 may process composite trading order 42 to aggress, substantially simultaneously, the different liquidity pools 70 of the related trading products underlying composite value 48. In particular, system 10 may process composite trading order 42 based on current market data 40 using known or proprietary mathematical computations and/or models that are associated with the types of trading products forming composite value 48. For example, certain market data 40 and mathematical computations and/or models may be used to process composite trading orders 42 associated with fixed income securities whereas different market data 40 and mathematical computations and/or models may be used to process composite trading orders 42 associated with currencies and futures contracts on currencies. Additionally, certain market data 40 and mathematical computations and/or models may be used to process composite trading orders 42 associated with fixed income securities, bond and note futures, bond and note options, currencies, futures on currencies, options on currencies, and/or any suitable number and combination of trading products underlying a single composite trading order 42. In each case, if trader 24 submits composite trading order 42, system 10 may generate and simultaneously execute constituent trading orders 46 corresponding to composite trading order 42. Constituent trading orders 46 are therefore understood as a collection of any number of trading orders for trading products that underlie composite value 48.

The foregoing example illustrates a composite trading value 48 representing a weighted quantity based on equivalents to 10-year notes. It should be understood, however, that composite trading value 48 may be configured to represent a weighted quantity based on equivalents to any suitable number and combination of trading products.

System 10 may comprise one or more clients 14. Clients 14 comprise any suitable local or remote end-user devices that may be used by traders 24 to access one or more elements of trading system 10, such as trading platform 12. For example, client 14 may comprise a computer, workstation, telephone, an Internet browser, an electronic notebook, a Personal Digital Assistant (PDA), a pager, or any other suitable device (wireless or otherwise), component, or element capable of receiving, processing, storing, and/or communicating information with other components of system 10. Client 14 may also comprise any suitable interface for trader 24 such as a display, microphone, keyboard, and/or any other appropriate terminal equipment according to particular configurations and arrangements. It will be understood that there may be any number of clients 14 coupled to trading platform 12.

Although clients 14 are described herein as being used by traders 24, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 20 in system 10.

Network 16 is a communication platform operable to exchange data or information between clients 14 and trading platform 12 and/or market centers 18. In some embodiments, network 16 may represent an Internet architecture that enables clients 14 to communicate with platform 12 and/or market centers 18. In other embodiments, network 16 may be a plain old telephone system (POTS), which traders 24 could use to perform the same operations or functions. In some embodiments, network 16 may be any packet data network (PDN) offering a communications interface or exchange between any two nodes in system 10. Network 16 may further comprise any combination of the above examples and any local area network (LAN), metropolitan area network (MAN), wide area network (WAN), wireless local area network (WLAN), virtual private network (VPN), intranet, or any other appropriate architecture or system that facilitates communications between clients 14 and platform 12 and/or market centers 18.

Market centers 18 comprise all manner of order execution venues including exchanges, Electronic Communication Networks (ECNs), Alternative Trading Systems (ATSs), market makers, or any other suitable market participants. Each market center 18 maintains a bid and offer price in a given trading product by standing ready, willing, and able to buy or sell at publicly quoted prices, also referred to as market center prices. A particular market center 18 may facilitate trading of multiple trading products, such as, for example, stocks, fixed income securities, futures contracts, currencies, precious metals, and so forth. Market centers 18 may output market data 40 associated with trading products. Market data 40 refers to current and/or historical market information such as, for example, trading conditions, trading volumes, best bid/offer prices, yield spreads, trends, and so forth.

Trading platform 12 is a trading architecture that facilitates the routing, matching, and otherwise processing of trading orders 20 and/or composite trading orders 42. Platform 12 may comprise a management center or a headquartering office for any person, business, or entity that seeks to manage the trading of orders 20. Accordingly, platform 12 may include any suitable combination of hardware, software, personnel, devices, components, elements, or objects that may be utilized or implemented to achieve the operations and functions of an administrative body or a supervising entity that manages or administers a trading environment. Trading platform 12 may comprise memory 34 and processor 32.

Memory 34 comprises any suitable arrangement of random access memory (RAM), read only memory (ROM), magnetic computer disk, CD-ROM, or other magnetic or optical storage media, or any other volatile or non-volatile memory devices that stores one or more files, lists, tables, or other arrangements of information. In particular, memory 34 may store trader profiles 36, ruleset 38, and logic 39.

Trader profiles 36 comprise information regarding the trading preferences 50 of traders 24. Each trader profile 36 in memory 34 may be associated with a particular trader 24. Trading preferences 50 may comprise ratios, price ranges, quantity ranges, thresholds, yield spreads, limits, conditions, and/or any other suitable criteria that trader 24 may deem relevant to a trading decision. Trading preferences 50 may relate to any aspect of trading orders 20 and/or composite trading orders 42 such as, for example, size, price, yield spreads, and so forth. According to certain embodiments, preference 50 of a particular trader 24 may be an algorithm, mathematical model, formula, function, and/or table customized, selected, and/or submitted by that trader 24 to system 10. Such a preference 50 may be used by processor 32 to generate composite value 48 to display to trader 24 associated with that preference 50. Preferences 50 may be default preferences (e.g., industry accepted formulas, values, models, etc.) or customized preferences (e.g., user specific formulas, values, models, etc.). Thus, different traders 24 may use different preferences 50 (e.g., parameters, thresholds, criteria, functions, models, etc.) such that processor 32 may generate composite value 48 according to the strategies, goals, plans, and/or trading tendencies of each trader 24. Moreover, traders 24 may have the same or different preferences 50 depending on the types of trading products being contemplated for the transaction.

Memory 34 may also store ruleset 38. Ruleset 38 may comprise data, algorithms, rules, tables, and/or functions for generating composite value 48 and processing composite trading orders 42. In particular, ruleset 38 may be usable to identify relationships among different trading products. Ruleset 38 may comprise relationship data 62 and rules 64. Relationship data 62 may comprise historical data for comparing the performance of various trading products. Rules 64 may comprise rules, formulas, algorithms, functions, and/or logic for weighing different trading products in generating composite value 48.

In addition to storing ruleset 38, memory 34 may store logic 39. Logic 39 may be any software, logic, or code stored on a computer-readable medium. When executed by processor 32, logic 39 may be operable to direct processor 32 to perform the functions and operations described herein.

Although FIG. 1 illustrates memory 34 as internal to trading platform 12, it should be understood that memory 34 may be internal or external to components of system 10, depending on particular implementations. Also, memory 34 illustrated in FIG. 1 may be separate or integral to other memory devices to achieve any suitable arrangement of memory devices for use in system 10.

Processor 32 may be communicatively coupled to memory 34. Processor 32 is generally operable to process market data 40 from market centers 18 to determine the liquidity associated with trading products in market centers 18. Processor 32 is further operable to generate composite value 48 and to process composite trading orders 42. Processor 32 comprises any suitable combination of hardware and software implemented in one or more modules to provide the described function or operation. Processor 32 may execute program instructions stored in memory 34 and comprise processing components to execute the program instructions.

It should be noted that the internal structure of trading platform 12, and the interfaces, processors, and memory devices associated therewith, are malleable and can be readily changed, modified, rearranged, or reconfigured in order to achieve its intended operations. It should be further understood that the internal structure of system 10, and the clients 14, market centers 18, trading platform 12, processors, and memory devices associated therewith, are malleable and can be changed, modified, or reconfigured in order to achieve the intended operations of system 10.

In operation, trading platform 12 may receive market data 40 from market centers 18. Using at least market data 40, processor 32 may generate composite value 48. Composite value 48 may be based on the liquidity of various trading products in market centers 18, on current and/or historical data associated with the various trading products, on trading preferences 50 of a particular trader 24, and/or on any number and suitable combination of mathematical computations and/or models. In some embodiments, composite value 48 may represent a weighted quantity of related trading products that are available for trade in various market centers 18 at any given time. Trading platform 12 may transmit composite value 48 to client 14.

Client 14 may display composite value 48 to trader 24. Composite value 48 may be displayed by client 14 according to various contextual positions and/or highlighting conventions operable to aid trader 24 in the recognition of a looming trading opportunity pursuant to preferences 50, trading strategies, and/or any suitable criteria. In a single action, trader 24 may input into client 14 composite trading order 42. Composite trading order 42 may be a quantity based on composite value 48. Client 14 may transmit composite trading order 42 to trading platform 12. Using market data 40, preferences 50, and/or ruleset 38, processor 32 may generate constituent trading orders 46 for one or more trading products underlying composite trading order 42. Trading platform 12 may substantially simultaneously transmit constituent trading orders 46 to market centers 18 for execution.

System 10 is thereby operable to display to trader 24 a single composite value 48 representing multiple trading products in multiple market centers 18. Using composite value 48, trader 24 may, in a single action, submit composite trading order 42 to aggress across liquidity pools 70 of multiple trading products. Upon receiving composite trading order 42, system 10 may generate multiple constituent trading orders 46 based on the related trading products underlying composite trading order 42. Constituent trading orders 46 may be transmitted substantially simultaneously to any number and combination of market centers 18 for execution. Thus, system 10 may save trader 24 the time and effort involved in preparing and submitting to different market centers 18 multiple individual trading orders 20 for related trading products. Because trading information associated with multiple trading products is presented as a single composite value 48, it may not be necessary for trader 24 to separately track different trading products underlying composite value 48 and their relationships and to subsequently trade on these separate trading products at various different times or with various different trading orders 20. Notably, because composite value 48 is based on relationships among multiple trading products in various market centers 18, trader 24 may aggress across multiple liquidity pools 70 with constituent trading orders 46 that collectively may be filled quickly and efficiently.

In FIG. 1, the generating of composite trading value 48 is performed by processor 32 in trading platform 12. According to certain embodiments, however, the functionality of generating composite trading value 48 may be performed by clients 14.

Figure 2:
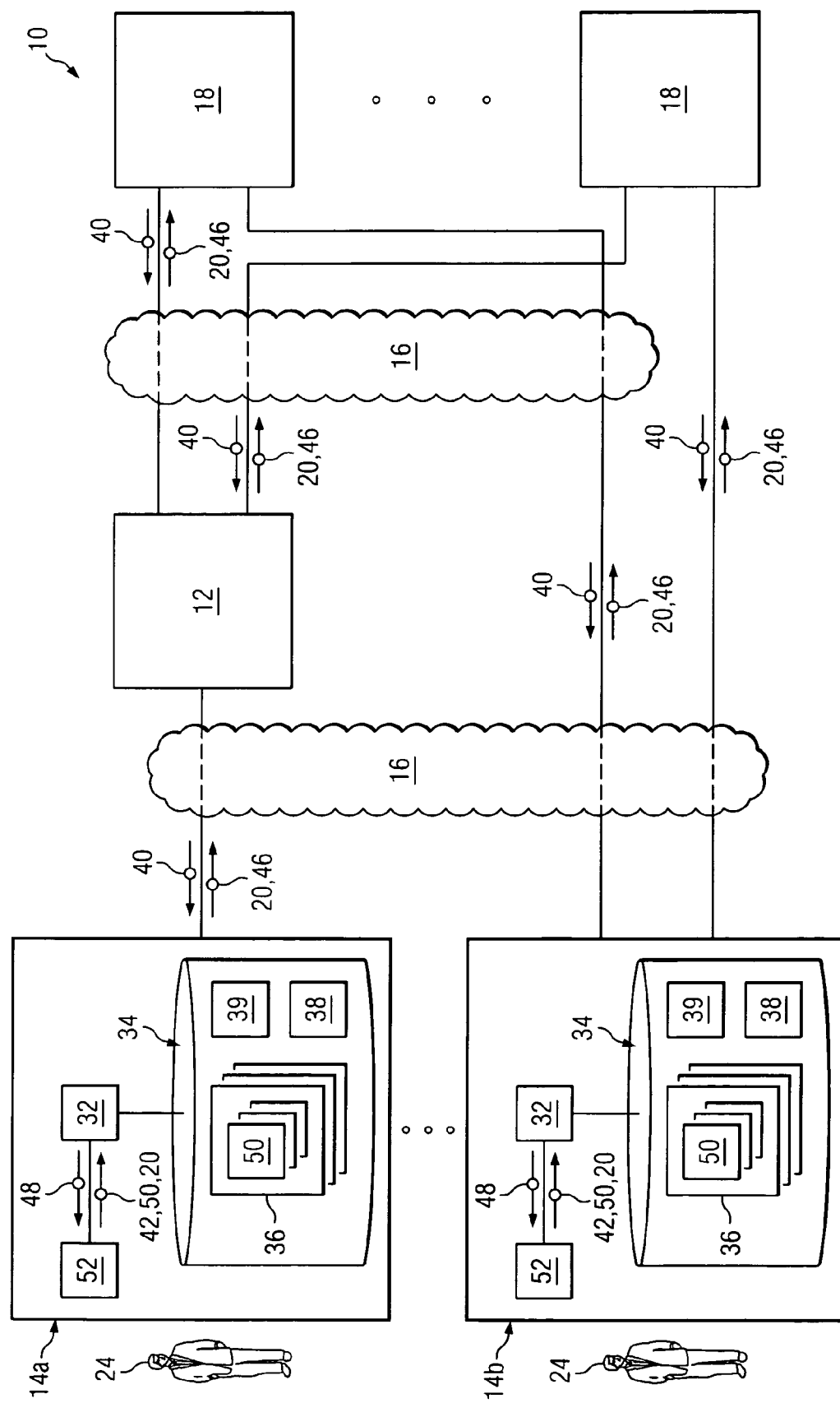
FIG. 2 illustrates an alternative architecture for the trading system according to certain embodiments of the present invention.

FIG. 2 illustrates an alternative architecture of trading system 10 according to certain embodiments of the present invention. In some embodiments, trading system 10 comprises clients 14, trading platform 12, and market centers 18. Some or all of the components of trading system 10 may be communicatively coupled via networks 16. Trading system 10 may be operable to perform the same functions and operations described above with respect to FIG. 1.

Trading system 10 may comprise market centers 18. Market centers 18 may be operable to receive trading orders 20 and/or constituent trading orders 46 from trading platform 12 and/or clients 14. Market centers 18 may be further operable to transmit to trading platform 12 and/or clients 14 market data 40.

Trading platform 12 may be communicatively coupled to market centers 18. In some embodiments, trading platform 12 may be operable to receive trading orders 20 and/or constituent trading orders 46 from clients 14. Trading platform 12 may be further operable to route trading orders 20 and/or constituent trading orders 46 to any suitable number and combination of market centers 18. Trading platform 12 may receive market data 40 from market centers 18 and may transmit market data 40 to clients 14.

Trading platform 12 may be operable to communicate with one or more clients 14. According to certain embodiments, some clients 14a may be communicatively coupled to trading platform 12. Other clients 14b may be communicatively coupled to market centers 18. Clients 14b may receive market data 40 from and may transmit trading orders 20 and/or constituent trading orders 46 to market centers 18 without the use of trading platform 12.

In certain embodiments, the functionality of generating composite value 48 may be performed by clients 14 rather than trading platform 12. In some embodiments, a particular client 14 may comprise processor 32, memory 34, and user interface 52. Generally, client 14 may use market data 40 to determine the liquidity of trading products in market centers 18. Using market data 40, ruleset 38, and/or preferences 50, client 14 may generate composite value 48 based at least in part on one or more trading products.

Client 14 may comprise user interface 52. Generally, user interface 52 may receive inputs from trader 24 and may provide trader 24 with an efficient and user friendly presentation of trading information. User interface 52 may represent any number and combination of suitable input and/or output devices such as, for example, a display, microphone, keyboard, and/or any other appropriate terminal equipment according to particular configurations and arrangements.

User interface 52 may be communicatively coupled to processor 32. Processor 32 may be operable to perform the same functions and operations described above with respect to FIG. 1. Processor 32 may be communicatively coupled to memory 34. Memory 34 may be operable to perform the same functions and operations described above with respect to FIG. 1. For example, memory 34 may store one or more trader profiles 36 associated with one or more traders 24. Each trader profile 36 may store one or more preferences 50 associated with one or more traders 24. In some embodiments, memory 34 of a particular client 14 may comprise trader profiles 36 for those traders 24 that are associated with that client 14.

In addition to storing trader profiles 36, memory 34 may store ruleset 38 and logic 39. Ruleset 38 and logic 39 are operable to perform the same functions and operations described above with respect to FIG. 1.

In operation, client 14 may receive market data 40 from market centers 18 and/or trading platform 12. Using at least market data 40, processor 32 may generate composite value 48. Composite value 48 may be based on the liquidity of various trading products in market centers 18, on current and/or historical data associated with the various trading products, on trading preferences 50 of a particular trader 24, and/or on any number and suitable combination of mathematical computations and/or models. In some embodiments, composite value 48 may represent a weighted quantity of related trading products that are available for trade in various market centers 18 at any given time.

Client 14 may display composite value 48 to trader 24. In a single action, trader 24 may input into client 14 composite trading order 42. Composite trading order 42 may be a quantity equal to all or a portion of the available liquidity of composite value 48. Upon receiving composite trading order 42, processor 32 may generate constituent trading orders 46 for one or more trading products underlying composite trading order 42. The characteristics of constituent trading orders 46 may be determined based on market data 40, preferences 50, ruleset 38, and/or any suitable trading information. Client 14 may substantially simultaneously transmit constituent trading orders 46 to market centers 18 for execution. Alternatively, client 14 may transmit constituent trading orders 46 to trading platform 12, which may forward constituent trading orders 46 to market centers 18 for execution.

In some embodiments, composite value 48 may be configured as an equivalent quantity of a particular trading product. As an example, composite value 48 may be configured to represent a quantity of "10-year equivalent" fixed income securities available for trade in market centers 18. The quantity of 10-year equivalent securities may encompass the total number of available 10-year notes as well as a weighted quantity of 2-year notes, 3-year notes, 5-year notes, and any other suitable number and combination of related trading products. Although this example is based on fixed income securities of certain maturities, it will be understood that composite value 48 may be based on any number and combination of trading products. The number and combinations of trading products represented by composite value 48 may be configured based at least in part on preferences 50 of a particular trader 24. For example, a particular trader 24 may prefer that composite value 48 be expressed as a weighted quantity of trading products equivalent to one or more currencies, fixed income securities of pre-configured maturities, equities, options, futures contracts and/or options contracts, interest rate derivatives, or any other suitable trading product. Thus, it should be understood that, based on preferences 50 of a particular trader 24, composite value 48 may be configured to represent liquidity of and relationships among any number and combination of trading products.

Trader 24 may submit preferences 50 for determining constituent trading orders 46. As an example, trader 24 may submit preferences 50 that comprise criteria for determining the nearest, least expensive, simplest, or most direct means for filling composite trading order 42. It should be understood that preferences 50 may specify any number of factors, thresholds, criteria, models, and/or functions for determining the market centers, relative make-up, sizes, and trading products associated with constituent trading orders 46.

Figures 3, 4A:
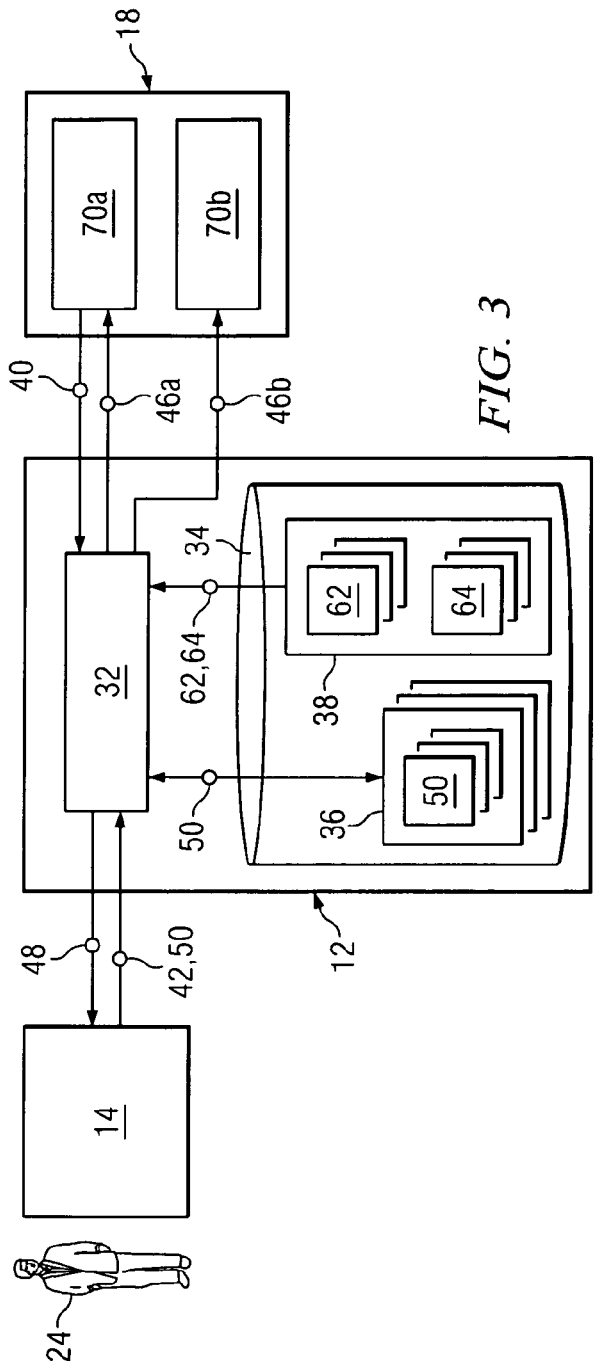
FIG. 3 illustrates a flow of operation among various components of the system illustrated in FIG. 1.
FIG. 4a illustrates market data according to certain embodiments of the present invention.

FIG. 3 illustrates a flow of operation among various components of system 10 illustrated in FIG. 1. Trading platform 12 may receive market data 40 from market centers 18. Market data 40 may comprise trading information for trading products traded in market centers 18. For each trading product, market data 40 may comprise information such as, for example, trade volumes, numbers of outstanding trading orders, best bid/offer prices, quantities, trends, and so forth.

Using at least market data 40, processor 32 may determine composite value 48. In particular, processor 32 may use market data 40 to determine the size of liquidity pools 70 associated with trading products in market centers 18. Processor 32 may also use relationship data 62 and rules 64 to identify relationships among various trading products in market centers 18. Relationship data 62 may comprise data for comparing the current and/or historical performances, prices, yield spreads, and other characteristics of different trading products. Rules 64 may comprise appropriate mathematical formulas and/or computation models for particular types of trading products. In addition to ruleset 38 and market data 40, processor 32 may use preferences 50 stored in trader profile 36 to determine composite value 48.

According to certain embodiments, composite value 48 may be expressed as a quantity of equivalent units of a particular trading product. For example, composite value 48 may be expressed as a number (or face value dollar amount) of "ten-year equivalent" fixed income securities. In other embodiments, composite value 48 may be expressed as a price per unit of composite trading order 42. Composite value 48 may be based on preferences 50, market data 40, relationship data 62, and/or characteristics of the constituent trading products such as, for example, best bid/offer prices, quantity, and so forth. In this regard, composite value 48 may be used by trader 24 to submit composite trading order 42 that is based on one or more trading products but may be equivalent (e.g., in value, size, price, spread, and/or any other suitable characteristic) with a particular trading order 20 for a single trading product, though more typically would be equivalent to a group of constituent trading orders 46, each of which acts as a trading order 20, but which collectively comprise composite trading order 42.

Notably, trading preferences 50 may comprise ratios, price ranges, quantity ranges, thresholds, yield spreads, limits, conditions, and/or any other suitable criteria that trader 24 may deem relevant to a trading decision. Trading preferences 50 may relate to any aspect of trading orders 20 and/or composite trading orders 42 such as, for example, instrument, market center, size, price, maturity, yield spreads, and so forth. According to certain embodiments, preference 50 of a particular trader 24 may be an algorithm, mathematical model, formula, function, and/or table customized, selected, and/or submitted by that trader 24 to system 10. Such a preference 50 may be used by processor 32 to generate composite value 48 to display to trader 24 associated with that preference 50.

Processor 32 may transmit composite value 48 to client 14, which may display composite value 48 to trader 24. In a single action, trader 24 may input into client 14 composite trading order 42. Composite trading order 42 may be a quantity based on composite value 48. Client 14 may transmit composite trading order 42 to trading platform 12. Using market data 40, preferences 50, and/or ruleset 38, processor 32 may generate constituent trading orders 46 for one or more trading products underlying composite trading order 42. Trading platform 12 may substantially simultaneously transmit constituent trading orders 46 to market centers 18 for execution.

Processor 32 may generate constituent trading orders 46 based on the constituent trading products underlying composite trading order 42. In particular, processor 32 may determine a quantity and/or price associated with each constituent trading order 46. This determination may be based on preferences 50, market data 40, rules 64, composite trading order 42, relationship data 62, and/or any other suitable information.

To determine the appropriate quantities of the constituent, related trading products underlying composite trading order 42, processor 32 may use any suitable information and any number and combination of mathematical functions and models. For example, to calculate how many two-year, three-year, and five-year notes are equivalent to a number of ten-year notes, processor 32 may use the coupons, frequencies, face values, prices, and maturity dates of two-year, three-year, five-year and ten-year notes as well as any number and combination of other suitable factors for weighing related trading products. In some instances, processor 32 may determine that the relative quantities of the related, constituent trading products underlying composite trading order 42 are such that composite trading order 42 may be filled by means of a single constituent trading order 46 for a single trading product. In other instances, processor 32 may determine that the relative quantities of the related, constituent trading products underlying composite trading order 42 are such that composite trading order 42 may preferably be filled by two or more constituent trading orders 46 for different trading products.

In some embodiments, processor 32 may seek the most closely correlated fulfillment of composite trading order 42 using preferences 50 of trader 24 stored in trader profile 36. Preferences 50 of trader 24 define some or all of the parameters, criteria, limits, and/or conditions deemed relevant by trader 24 in making trading decisions. For example, trader 24 may prefer that the yield spreads associated with certain trading products underlying composite trading order 42 be less than or greater than a configurable threshold. As another example, trader 24 may prefer that trading product X never be more than 50% of any composite trading order 42. Although preferences 50 are illustrated above as percentages and yield spreads, it should be understood that preferences 50 may be based on any characteristic, relationship, or value of any trading product.

Upon generating constituent trading orders 46, processor 32 may transmit constituent trading orders 46 to the appropriate liquidity pools 70 in market centers 18 for execution. Constituent trading orders 46 may be generated and executed substantially simultaneously. Thus, by using a composite trading order 42 to simultaneously generate and process constituent trading orders 46, system 10 in some embodiments enables trader 24 to simultaneously aggress across liquidity pools 70 of related trading products. In addition, because system 10 displays composite trading order 42 associated with a single composite value 48, it is not necessary in some embodiments for trader 24 to separately track the constituent trading products and their relationships and or to aggress on them individually through separate transactions.

An example illustrates certain embodiments of the present invention. Trading platform 12 receives market data 40 from market centers 18. Using at least market data 40, processor 32 generates composite value 48. Based on preferences 50 of trader 24, composite value 48 is configured as a weighted quantity of trading products related to Euros. Thus, based on preferences 50, market data 40, and ruleset 38, composite value 48 represents a volume of Euro equivalents that are available for trade in market centers 18. Trading platform 12 transmits composite value 48 to client 14, which displays composite value 48 to trader 24.

At a particular time, composite value 48 equals 20,000,000 Euro equivalents. At this point, trader 24 decides to submit composite trading order 42 for 10,000,000 of the 20,000,000 Euro equivalents displayed as composite value 48. Accordingly, trader 24 inputs the quantity "10,000,000" into client 14 as composite trading order 42. Trading platform 12 routes composite trading order 42 to processor 32.

In this example, market center 18 comprises liquidity pool 70a that is associated with Euros. Based on market data 40, processor 32 determines that only 8,000,000 Euros are available to satisfy composite trading order 42 in liquidity pool 70a. Accordingly, processor 32 determines that liquidity pool 70a is insufficient to fill composite trading order 42 in its entirety.

However, composite value 48 may be based on liquidity pools 70 of other trading products related to Euros. In particular, in generating composite value 48, processor 32 may have determined that six-month futures contracts for Euros (issued on a particular date) are related to the trading product of Euros (e.g., currency futures related to the particular currency). Processor 32 may have determined that the two trading products—Euros and six-month futures on Euros—have similar performance histories. Accordingly, because composite value 48 is based in part on six-month futures contracts for Euros, processor 32 may generate at least one constituent trading order 46 for six-month futures contracts for Euros. In the present example, processor 32 uses composite trading order 42 to generate constituent trading orders 46 wherein the constituent trading products are Euros and six-month futures on Euros. The collective value of the two constituent trading orders 46 may be substantially equivalent to 10,000,000 Euros. In this example, based at least in part on exchange rates, hedge ratios, and/or other market data 40, the 10,000,000 Euro equivalents may be 8,000,000 Euros and 2,200,000 six-month futures on Euros. Thus, processor 32 may generate constituent trading orders 46 that are substantially equivalent to composite trading order 42 in value.

In the present example, trader 24 has only one preference 50—that no composite trading order 42 be based on a currency futures contract of more than six months. In this example, the only futures contract underlying composite trading order 42 is a six-month futures contract. Thus, composite trading order 42 satisfies preference 50 associated with trader 24. Processor 32 has generated two constituent trading orders 46. One constituent trading order 46a is for 8,000,000 Euros. The other constituent trading order 46b is for 2,200,000 six-month futures on Euros. The prices, quantities, and other characteristics associated with constituent trading orders 46 may be based on market data 40, ruleset 38, preferences 50, and/or any other suitable information. Processor 32 may simultaneously transmit constituent trading orders 46 to market centers 18 for execution. Constituent trading order 46a may be transmitted to liquidity pool 70a associated with Euros. Constituent trading order 46b may be transmitted to liquidity pool 70b associated with six-month futures contracts on Euros. Inasmuch as composite value 48 was derived from the aggregated available Euro equivalent value across both liquidity pools 70a and 70b, and inasmuch as aggressing composite value 48 through composite trading order 42 led to the generation of constituent trading orders 46a and 46b based on the conditions in liquidity pools 70a and 70b, it is likely that both constituent trading orders 46a and 46b will be filled promptly and efficiently. In the event that composite trading order 42 could not be filled through the transmission of constituent trading orders 46 to a single market center 18, additional constituent trading orders 46 may be transmitted to multiple market centers 18 in fulfillment of composite trading order 42.

Although the foregoing example illustrates composite trading order 42 based on a currency and futures contracts, it should be understood that composite trading order 42 may be based on any suitable number and combination of trading products. For example, system 10 may generate composite value 48 to facilitate trading of various cash and futures products that are weighted according to any suitable characteristics, such as, for example, basis, maturity, price, and so forth. In particular, composite value 48 may be based on a weighted quantity of cash notes and bonds of differing maturities as well as on various futures contracts associated with the cash notes and bonds. Various trading products underlying composite value 48 may be weighted according to any number and combination of factors such as, for example, yield, basis (e.g., difference between cash price and futures price of a given commodity), and quantity. Such factors may be stored in ruleset 38, received as preferences 50 of trader 24, derived from market data 40, and/or obtained from any other suitable source.

In a particular example, trader 24 uses preferences 50 to configure composite value 48 to be based on 10-year notes, 10-year futures, and 5-year futures available in market centers 18. At a given time, there may be $10,000,000 face value 10-year notes, 5,000 10-year futures contracts, and 3,000 5-year futures contracts available for trade in market centers 18. Using ruleset 38, market data 40 (e.g., basis information, hedge ratios, price, etc.), and preferences 50 submitted by trader 24, processor 32 may determine that 5,000 10-year futures contracts are substantially equivalent to $409,500,000 face value 10-year notes and that 3,000 5-year futures contracts are substantially equivalent to $143,678,000 face value 10-year notes. Thus, composite value 48 in this example may be expressed as $563,178,000 10-year equivalent securities. Using composite value 48, trader 24 may in a single action submit composite trading order 42 to aggress, substantially simultaneously, across multiple liquidity pools associated with 10-year notes, 10-year futures, and 5-year futures. Although the foregoing example illustrates composite value 48 as based on cash fixed income securities and futures on fixed income securities, it will be understood that composite value 48 may be based on any number, type, and combination of trading products.

As additional examples, composite trading order 42 may be based on fixed income securities of a certain maturity, on fixed income securities of differing maturities, on cash fixed income securities and futures contracts for cash fixed income securities, on an equity and/or on an underlying option associated with that equity, on baskets of equities as they relate to equity indices, on listed equity options, and on liquidity pools 70 of any number and combination of trading products in any number and combination of market centers 18. Thus, it should be understood that composite trading order 42 may trigger the creation of any number of constituent trading orders 46 based on any suitable number, type, and combination of trading products such as, for example, goods, services, commodities, stocks, fixed income securities, interest rate derivatives, equities, options, currencies, precious metals, futures contracts, and so forth, pursuant to conditions, preferences, and tolerances specified by the user through the application of preferences 50, relationship data 62, rules 64, and/or any number and combination of suitable mathematical computations and/or models.

It will be understood that processor 32 uses market data 40, relationship data 62, rules 64, and/or any number and combination of suitable mathematical computations and/or models to determine the appropriate quantities of the constituent, related trading products underlying composite trading order 42. For example, to calculate how many bond futures are equivalent to a number of cash fixed income securities, processor 32 may use hedge ratios, coupons, frequencies, face values, prices, and maturity dates associated with the related trading products as well as any number and combination of other suitable factors for weighing related trading products.

Although the foregoing example illustrates liquidity pools 70 as being located in the same market center 18, it should be understood that liquidity pools 70a and 70b may be located in separate market centers 18. It should be further understood that a given liquidity pool 70 may be located in one market center 18 or spread among market centers 18.

Although the foregoing example illustrates two constituent trading products underlying composite trading order 42, it should be understood that composite trading order 42 and/or composite value 48 may be based on any number and combination of trading products.

FIG. 4a illustrates an example of market data 40 according to one embodiment of the present invention. In the present example, market data 40 relates to notes and bonds of differing maturities that are available for trade in market centers 18. Processor 32 is operable to determine composite value 48 based at least in part on market data 40. Composite value 48 may be based on market data 40, preferences 50, relationship data 62, rules 64, and/or any number and combination of suitable mathematical computations and/or models.

Figure 4B:
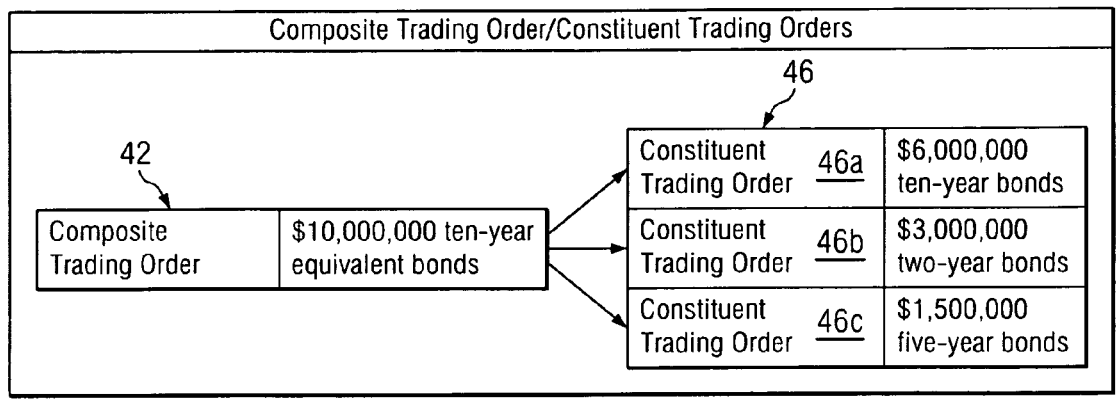
FIG. 4b illustrates trading information according to certain embodiments of the present invention.
Figure 4C:
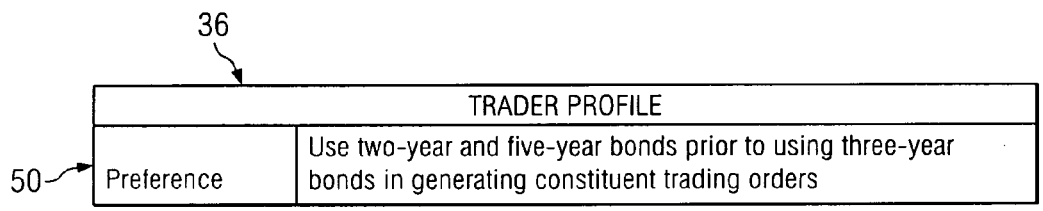
FIG. 4c illustrates a trader profile according to certain embodiments of the present invention.

FIG. 4b illustrates an example of composite trading order 42 and constituent trading orders 46 according to one embodiment of the present invention. Trader 24 may use composite value 48 to submit composite trading order 42 for all or a portion of composite value 48. In the present example, trader 24 submits composite trading order 42 for $10,000,000 face value ten-year equivalent securities. Upon receiving composite trading order 42, processor 32 generates one or more constituent trading orders 46 based on trading products underlying composite value 48. In generating constituent trading orders 46, processor 32 relies in part on preferences 50 associated with trader 24. FIG. 4c illustrates an example of trader profile 36 according to certain embodiments of the present invention. Based on trader profile 36 in the present example, processor 32 determines that trader 24 prefers to use two-year and five-year notes prior to using three-year notes in generating constituent trading orders 46. Accordingly, using market data 40, ruleset 38, and/or preferences 50, processor 32 generates three constituent trading orders 46 with a collective value of $10,000,000 face value ten-year equivalent securities. In the present example, constituent trading orders 46 comprise constituent trading order 46a for $6,000,000 face value ten-year notes, constituent trading order 46b for $3,000,000 face value two-year notes, and constituent trading order 46c for $1,500,000 face value five-year notes. Processor 32 determines that this combination of trading products is substantially equivalent to $10,000,000 face value ten-year notes. Accordingly, processor 32 transmits constituent trading orders 46 to market centers 18 for execution.

In the foregoing example, processor 32 identifies two-year, three-year, five-year, and ten-year notes as being related trading products for the purpose of generating composite value 48. It will be understood, however, that processor 32 may identify any other related trading products such as, for example, futures contracts on fixed income securities, interest rate derivatives, equities, and/or any other trading product, according to ruleset 38 and/or preferences 50 of a particular trader 24 as configured into system 10.

In the foregoing example, trader profile 36 associated with trader 24 comprises preference 50 based on an order of priority among notes and bonds of differing maturities. It will be understood, however, that trader profile 36 may comprise any number of preferences 50. It will also be understood that preferences 50 may be based on price ranges, yield spreads, ratios, and any other suitable characteristic and combination of characteristics associated with market data 40 and/or composite trading order 42.

In some embodiments, system 10 may be configured to generate composite value 48 and/or composite trading order 42 in response to any suitable number and combination of conditions. For example, in one embodiment, system 10 may be configured to generate composite trading order 42 in response to receiving a traditional trading order 20 for a particular quantity of a particular trading product if processor 32 determines, using at least market data 40, that trading order 20 may not be filled, for example because there is insufficient liquidity in one or more market centers 18 to completely or partially fill trading order 20 for the specified trading product. In this circumstance, processor 32 may then generate, based at least on preferences 50, a particular composite trading order 42 that is substantially equivalent to trading order 20. Composite trading order 42 may be based on one or more trading products that are related to the particular trading product underlying trading order 20. Processor 32 may generate composite trading order 42 based on market data 40, preferences 50, ruleset 38, composite value 48, and/or any suitable number and combination of mathematical calculations and/or models. Using composite trading order 42, processor 32 may generate one or more constituent trading orders 46 for one or more trading products underlying composite trading order 42. In some embodiments, processor 32 may automatically transmit constituent trading orders 46 to one or market centers for execution. In other embodiments, client 14 may first display composite trading order 42 and a message indicating that there is insufficient liquidity to fill trading order 20 solely with the specified trading product. Trader 24 may then decide to proceed with composite trading order 42, and using client 14, trader 24 may in a single action submit composite trading order 42 to aggress, substantially simultaneously, across multiple liquidity pools associated with the trading products underlying composite trading order 42. Although the foregoing example illustrates a condition based on receipt of a traditional trading order 20, it should be understood that system 10 may be configured with any number and combination of suitable conditions for generating composite value 48 and/or composite trading order 42.

In some embodiments, system 10 may be configured to monitor whether constituent trading orders 46 are filled successfully in one or more market centers 18. System 10 may consider constituent trading order 46 "not filled successfully" if it is not filled completely, not filled within a configurable time period, and/or not filled according to any suitable criteria. The criteria defining whether constituent trading order 46 is filled successfully may be configured by trader 24 as customized preferences 50, may be based on industry standards, may be configured as default settings in system 10, and/or may be based on any suitable factors. When processor 32 determines that a particular constituent trading order 46 is not filled successfully, processor 32 may generate one or more new constituent trading orders 46. The new constituent trading order(s) 46 may be configured to be substantially equivalent to all of the unfilled portion of the preceding constituent trading order 46. A new constituent trading order 46 may be for the same or for different trading product(s) than was (were) associated with the preceding constituent trading order 46. A new constituent trading order 46 may be transmitted to the same or to different market center(s) 18 than was (were) associated with the preceding constituent trading order 46. Processor 46 may generate any number of new constituent trading orders 46 to be substantially equivalent to a preceding constituent trading order 46. In some embodiments, the above-mentioned functions and operations may be referred to as "multipass" processing of constituent trading orders 46.

Notably, in some embodiments of multipass processing, the new constituent trading orders 46 may be based at least in part on current market data 40. In particular, a new constituent trading order 46 may be based on different market data 40 than was used to generate the preceding constituent trading order 46. Because a new constituent trading order may be based on current market data 40, a new constituent trading order 46 may be more likely to be successfully filled than a preceding constituent trading order 46.

In some embodiments, processor 32 may continue the multipass processing of constituent trading orders 46 until the associated composite trading order 42 is filled completely. In other embodiments, there may be limits on the number of iterations involved in multipass processing of constituent trading orders 46. For example, processor 32 may monitor and generate new constituent trading orders 46 for a certain period of time after receiving composite trading order 42, for a certain number of iterations, or according to any number and combination of limits. The limit(s) associated with multipass processing of constituent trading orders 46 may be defined by trader 24 as customized preferences 50, may be based on industry standards, may be configured as default settings in system 10, and/or may be based on any suitable criteria.

The present invention offers several advantages. It should be noted that one or more embodiments may benefit from some, none, or all of the advantages discussed below. One advantage of the present invention is that it displays to trader 24 a single composite value 48 representing multiple trading products in various market centers 18. Accordingly, trader 24 is no longer required to separately track different trading products and their relationships.

As another advantage, system 10 automatically generates constituent trading orders 46 in order to substantially simultaneously aggress across liquidity pools 70 of related trading products. According to certain embodiments, because constituent trading orders 46 are based on composite trading order 42, there is typically sufficient liquidity in market centers 18 to quickly fill constituent trading orders 46. Because constituent trading orders 46 may be filled quickly, the sizes and existence of constituent trading orders 46 may not become known to other traders 24 before constituent trading orders 46 are filled. As a result, before constituent trading orders 46 are filled, other traders 24 may not be able to adversely affect the prices and/or availability of trading products associated with constituent trading orders 46 prior to any particular leg of a multi-leg transaction being executed.

According to certain embodiments, trader 24 may configure processor 32 and memory 34 to hold one or more composite trading orders 42 until composite value 48 reaches a particular limit and/or threshold. When composite value 48 satisfies the pre-configured limit and/or threshold, processor 32 may use current market data 40 to generate constituent trading orders 46 based on composite trading order 42. Processor 32 may then use constituent trading orders 46 to aggress across liquidity pools 70 of related trading products. By configuring processor 32 and memory 34 to hold composite trading order 42, and not submitting them to market centers 18 to be queued, the limits and/or intent of trader 24 are not disclosed to other market participants. When the limits and/or thresholds associated with composite trading order 42 occur, processor 32 may submit constituent trading orders 46 to market centers 18 as fresh trading orders 20. Thus, system 10 may prevent other market participants from knowing of composite trading orders 42 waiting to aggress various liquidity pools 70.

As another advantage, client 14 displays to trader 24 a single composite value 48. Trader 24 may aggress composite value 48 by means of a single input such as, for example, a keystroke, voice command, mouse click, or any other suitable input. Upon detecting the input indicating a composite trading order 42, processor 32 may generate any suitable number and combination of constituent trading orders 46 based at least in part upon composite trading order 42. Processor 32 may substantially simultaneously transmit constituent trading orders 46 to market centers 18 for execution. Thus, with a single input, trader 24 may effect the submission and execution of multiple constituent trading orders 46 for related trading products. Accordingly, system 10 may save trader 24 the time involved in separately preparing and inputting trading orders 20 for related trading products.

Figure 5:
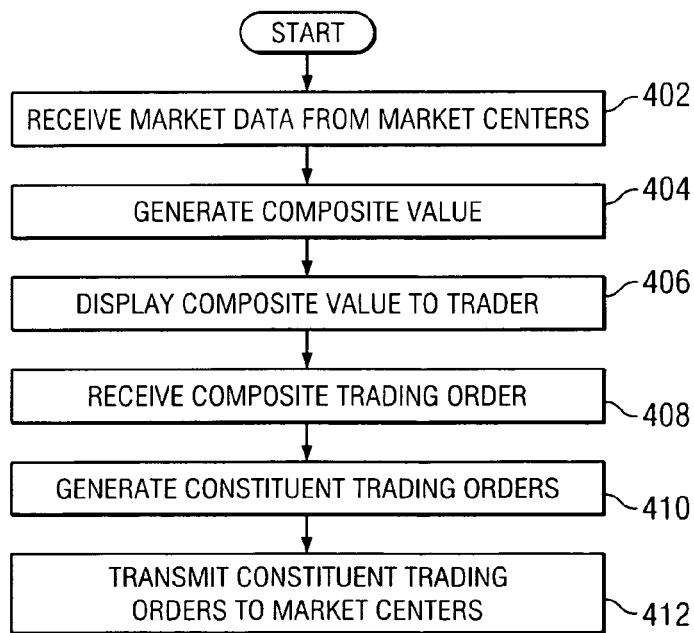
FIG. 5 illustrates a flowchart of an exemplary method for processing composite trading orders.

FIG. 5 illustrates a flow chart for processing a composite trading order 42 according to one embodiment of the present invention. The method begins at step 402 where trading platform 12 receives market data from market centers 18. Market data 40 comprises information regarding current market conditions such as, for example, trading volumes, numbers of outstanding trading orders 20, quantities, best bid/offer prices, trends, and so forth. At step 404, processor 32 generates composite value 48. Composite value 48 may be a single value that encompasses the relationships among and the liquidity of multiple trading products in multiple market centers 18. In particular, composite value 48 may represent a weighted quantity of related trading products that are available for trade in various market centers 18. The related trading products underlying composite value 48 may correlate in their performance trends, may be based on the same type of financial instrument, or may be otherwise related according to any suitable number and combination of characteristics. Composite value 48 may be based on market data 40, preferences 50 in trader profile 36, ruleset 38, and/or any suitable mathematical calculations and/or models for determining relationships among trading products. Processor 32 may update composite value 48 as market data 40 is received from market centers 18.

At step 406, client 14 displays composite value 48 to trader 24. At step 408, client 14 receives composite trading order 42 from a trader 24. Composite trading order 42 may be input into client 14 using a single input such as, for example, a keystroke, voice command, mouse click, or any other suitable input mechanism. Composite trading order 42 may be a quantity equal to all or a portion of composite value 48.

At step 410, processor 32 may generate one or more constituent trading orders 46 associated with one or more trading products underlying composite value 48. To determine the relative size and weights of constituent trading orders 46, processor 32 may use market data 40, ruleset 38, preferences 50, and/or any number and combination of suitable mathematical calculations and/or models. In certain situations, ruleset 38, preferences 50, and/or any number and combination of suitable mathematical calculations and/or models may indicate that composite trading order 42 may be substantially equivalent to a single trading order 20 for a particular trading product. More typically, composite trading order 42 would be substantially equivalent to a group of constituent trading orders 46, each of which acts as a single trading order 20, but which collectively comprise composite trading order 42.

At step 412, processor 32 may, substantially simultaneously, transmit constituent trading orders 46 to market centers 18 for execution. Thus, system 10 may enable trader 24 to aggress multiple liquidity pools 70 of related trading products in a single action.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus, comprising:
a processor; and
a memory, communicatively coupled to the processor, storing instructions that, when executed, cause the processor to:
   receive a first trading order for a first quantity of a first trading product from a first trader;
   determine that a particular quantity of the first trading product is available for trade in one or more market centers;
   determine that the particular quantity of the first trading product is insufficient to fill the first trading order for the first quantity of the first trading product;
   identify a plurality of trading products, wherein the plurality of trading products comprises the first trading product, and wherein identifying the plurality of trading products comprises, for each trading product of the plurality of trading products other than the first trading product, determining that a respective quantity of the trading product is substantially equivalent to a quantity of the first trading product;
   receive market data from the one or more market centers, wherein the market data relates to the plurality of trading products;
   determine, based at least in part on the market data and the plurality of trading products, a composite value, wherein the composite value comprises: a weighted quantity of at least one trading product of the plurality of trading products other than the first trading product; and the particular quantity of the first trading product; and wherein determining the composite value comprises:
      determining the weighted quantity of the at least some of the plurality of trading products other than the first trading product by summing together one or more weighted quantities of one or more trading products of the plurality of the trading products other than the first trading product; and
      summing the particular quantity of the first trading product and the weighted quantity;
   perform at least one of:
      receiving, from the first trader, a composite trading order for at least a portion of the composite value; and
      generating the composite trading order;
   determine, based at least in part on the composite trading order, one or more constituent trading orders, wherein the one or more constituent trading orders are configured to, if filled, combine to satisfy the composite trading order, and wherein at least two of identifying the plurality of trading products, determining the composite value, and determining the one or more constituent trading orders, are based at least in part on one or more stored preferences of the first trader;

transmit, on behalf of the first trader, the one or more constituent trading orders to the one or more market centers;

monitor whether the one or more constituent trading orders are filled successfully in the one or more market centers;

determine that at least one constituent trading order of the one or more constituent trading orders was not filled successfully within a configurable time period; and determine one or more new constituent trading orders, wherein the one or more new constituent trading orders are configured to be substantially equivalent to an unfilled portion of the at least one constituent trading order.

2. The apparatus of claim 1, wherein the market data represent trading conditions in the one or more market centers.

3. The apparatus of claim 1, wherein the instructions, when executed, further cause the processor to:
update the composite value according to current trading conditions in the one or more market centers.

4. The apparatus of claim 1, wherein the composite value is usable to track the plurality of trading products.

5. The apparatus of claim 1, wherein the composite value is substantially equivalent to a quantity of the first trading product.

6. The apparatus of claim 1, wherein the composite value corresponds to available volumes of the first trading product and the at least one trading product of the plurality of trading products other than the first trading product in the one or more market centers.

7. The apparatus of claim 1, wherein:
the one or more constituent trading orders comprise a first constituent trading order for one trading product of the plurality of trading products and a second constituent trading order for another trading product of the plurality of trading products.

8. The apparatus of claim 7, wherein:
the one trading product comprises a note associated with a first maturity; and
the another trading product comprises a note associated with a second maturity.

9. The apparatus of claim 7, wherein:
the one trading product comprises a particular currency; and
the another trading product comprises a futures contract associated with the particular currency.

10. The apparatus of claim 7, wherein:
the one trading product comprises a note; and
the another trading product comprises a futures contract associated with the note.

11. The apparatus of claim 1, wherein the instructions, when executed, further cause the processor to:
retrieve, from the memory, a first trader profile, the first trader profile being associated with the first trader and comprising the one or more stored preferences of the first trader.

12. The apparatus of claim 1, further comprising:
a user interface, wherein the user interface is communicatively coupled to the processor.

13. A method, comprising:
receiving, by a processor of a computer, a first trading order for a first quantity of a first trading product from a first trader;

determining, by the processor, that a particular quantity of the first trading product is available for trade in one or more market centers;

determining, by the processor, that the particular quantity of the first trading product is insufficient to fill the first trading order for the first quantity of the first trading product;

identifying, by the processor, a plurality of trading products, wherein the plurality of trading products comprises the first trading product, and wherein identifying the plurality of trading products comprises, for each trading product of the plurality of trading products other than the first trading product, determining that a respective quantity of the trading product is substantially equivalent to a quantity of the first trading product;

receiving, by the processor, market data from the one or more market centers, wherein the market data relates to the plurality of trading products;

determining, by the processor, based at least in part on the market data and the plurality of trading products, a composite value, wherein the composite value comprises: a weighted quantity of at least one trading product of the plurality of trading products other than the first trading product; and the particular quantity of the first trading product; and wherein determining the composite value comprises:

determining, by the processor, the weighted quantity of the at least some of the plurality of trading products other than the first trading product by summing together one or more weighted quantities of one or more trading products of the plurality of the trading products other than the first trading product; and summing, by the processor, the particular quantity of the first trading product and the weighted quantity;

performing, by the processor, at least one of:
receiving, by the processor, from the first trader, a composite trading order for at least a portion of the composite value; and
generating, by the processor, the composite trading order;

determining, by the processor, based at least in part on the composite trading order, one or more constituent trading orders, wherein the one or more constituent trading orders are configured to, if filled, combine to satisfy the composite trading order, and wherein at least two of identifying the plurality of trading products, determining the composite value, and determining the one or more constituent trading orders, are based at least in part on one or more stored preferences of the first trader;

transmitting, by the processor, on behalf of the first trader, the one or more constituent trading orders to the one or more market centers;

monitor, by the processor, whether the one or more constituent trading orders are filled successfully in the one or more market centers;

determine, by the processor, that at least one constituent trading order of the one or more constituent trading orders was not filled successfully within a configurable time period; and determine, by the processor, one or more new constituent trading orders, wherein the one or more new constituent trading orders are configured to be substantially equivalent to an unfilled portion of the at least one constituent trading order.

14. One or more non-transitory tangible computer-readable media storing instructions that, when executed, cause a processor to:

receive a first trading order for a first quantity of a first trading product from a first trader;

determine that a particular quantity of the first trading product is available for trade in one or more market centers;

determine that the particular quantity of the first trading product is insufficient to fill the first trading order for the first quantity of the first trading product;

identify a plurality of trading products, wherein the plurality of trading products comprises the first trading product, and wherein identifying the plurality of trading products comprises, for each trading product of the plurality of trading products other than the first trading product, determining that a respective quantity of the trading product is substantially equivalent to a quantity of the first trading product;

receive market data from the one or more market centers, wherein the market data relates to the plurality of trading products;

determine, based at least in part on the market data and the plurality of trading products, a composite value, wherein the composite value comprises: a weighted quantity of at least one trading product of the plurality of trading products other than the first trading product; and the particular quantity of the first trading product; and wherein determining the composite value comprises:

determining the weighted quantity of the at least some of the plurality of trading products other than the first trading product by summing together one or more weighted quantities of one or more trading products of the plurality of the trading products other than the first trading product; and summing the particular quantity of the first trading product and the weighted quantity;

perform at least one of:

receiving, from the first trader, a composite trading order for at least a portion of the composite value; and generating the composite trading order;

determine, based at least in part on the composite trading order, one or more constituent trading orders, wherein the one or more constituent trading orders are configured to, if filled, combine to satisfy the composite trading order, and wherein at least two of identifying the plurality of trading products, determining the composite value, and determining the one or more constituent trading orders, are based at least in part on one or more stored preferences of the first trader;

transmit, on behalf of the first trader, the one or more constituent trading orders to the one or more market centers;

monitor whether the one or more constituent trading orders are filled successfully in the one or more market centers;

determine that at least one constituent trading order of the one or more constituent trading orders was not filled successfully within a configurable time period; and determine one or more new constituent trading orders, wherein the one or more new constituent trading orders are configured to be substantially equivalent to an unfilled portion of the at least one constituent trading order.

15. The apparatus of claim 1, wherein the instructions, when executed, further cause the processor to:

receive updated market data from the one or more market centers; and wherein determining the one or more new constituent trading orders comprises:

determining the one or more new constituent trading orders based at least in part on the updated market data.

16. The apparatus of claim 15, wherein the instructions, when executed, further cause the processor to:

transmit, on behalf of the first trader, the one or more new constituent trading orders to at least one market center of the one or more market centers.

17. The apparatus of claim 16, wherein the instructions, when executed, further cause the processor to:

monitor whether the one or more new constituent trading orders are filled successfully in the at least one market center;

determine that at least one new constituent trading order of the one or more new constituent trading orders was not filled successfully;

receive further updated market data from the one or more market centers; and determine, based at least in part on the further updated market data, one or more additional constituent trading orders, wherein the one or more additional constituent trading orders are configured to be substantially equivalent to an unfilled portion of the at least one new constituent trading order.

18. The apparatus of claim 16, wherein the instructions, when executed, further cause the processor to:

continue determining additional constituent trading orders and transmitting the additional constituent trading orders to at least some of the one or more market centers until all constituent trading orders underlying the composite trading order are filled and the composite trading order is satisfied.

19. The apparatus of claim 1, wherein identifying the plurality of trading products further comprises:

for each trading product of the plurality of trading products other than the first trading product:

determining that the trading product is related to the first trading product based in part on relationship data.

20. The apparatus of claim 1, wherein identifying the plurality of trading products further comprises:

identifying the plurality of trading products based at least in part on the one or more stored preferences of the first trader.

21. The apparatus of claim 1, wherein the instructions, when executed, further cause the processor to:

receive updated market data from the one or more market centers, wherein the updated market data relates to the plurality of trading products.

22. The apparatus of claim 21, wherein receiving the updated market data comprises:

receiving the updated market data from the one or more market centers via at least one of a network and a trading platform.

23. The apparatus of claim 21, wherein determining the one or more constituent trading orders comprises:

determining, based at least in part on the updated market data, the one or more constituent trading orders.

24. The apparatus of claim 1, wherein receiving the market data comprises:

receiving the market data from the one or more market centers via at least one of a network and a trading platform.

25. The apparatus of claim 1, wherein transmitting the one or more constituent trading orders comprises:
transmitting the one or more constituent trading orders to the one or more market centers via at least one of a network and a trading platform.

26. The apparatus of claim 1, wherein a client comprises the apparatus.

27. The apparatus of claim 26, wherein the client communicates with a trading platform via a network.

28. The apparatus of claim 1, wherein a trading platform comprises the apparatus.

29. The apparatus of claim 1, wherein the market data relates to the availability for trade of the plurality of trading products in the one or more market centers.

30. The apparatus of claim 1, wherein determining the composite value comprises:
determining the composite value based at least in part on the one or more stored preferences of the first trader.

31. The apparatus of claim 1, wherein determining the one or more constituent trading orders comprises:
determining the one or more constituent trading orders based at least in part on the one or more stored preferences of the first trader.

32. The apparatus of claim 1, wherein the at least a portion of the composite value is substantially equivalent to the first quantity of the first trading product.

33. The apparatus of claim 1, wherein the instructions, when executed, cause the processor to:
receive the composite trading order for at least the portion of the composite value, wherein receiving the composite trading order comprises:
receiving at least one input from the first trader, wherein the at least one input represents the composite trading order.

34. The apparatus of claim 33, wherein the instructions, when executed, further cause the processor to:
display the composite value at a user interface, wherein the user interface is communicatively coupled to the processor.

35. The apparatus of claim 1, wherein the instructions, when executed, cause the processor to:
generate the composite trading order for at least the portion of the composite value.

36. The apparatus of claim 35, wherein generating the composite trading order comprises:
generating the composite trading order based at least in part on the composite value.

37. The apparatus of claim 36, wherein generating the composite trading order comprises:
generating the composite trading order based at least in part on the one or more stored preferences of the first trader.

38. The apparatus of claim 35, wherein the instructions, when executed, further cause the processor to:
display the composite trading order at a user interface, wherein the user interface is communicatively coupled to the processor.

39. The apparatus of claim 38, wherein the instructions, when executed, further cause the processor to:
display a message at the user interface, wherein the message indicates that the first trading order cannot be filled from the one or more market centers solely with the first trading product.

40. The apparatus of claim 39, wherein the instructions, when executed, further cause the processor to:
receive an input from the first trader, wherein the input is indicative of a decision to submit the composite trading order; and
wherein determining the one or more constituent trading orders comprises:
determining the one or more constituent trading orders responsively to the input.

41. The apparatus of claim 1, wherein the instructions, when executed, cause the processor to:
generate the composite trading order based at least in part on a first preference of the one or more stored preferences of the first trader; and
wherein determining the composite value comprises:
determining the composite value based at least in part on a second preference of the one or more stored preferences of the first trader and not on the first preference; and
wherein determining the one or more constituent trading orders comprises:
determining the one or more constituent trading orders based at least in part on a third preference of the one or more stored preferences of the first trader and not on the first preference.

42. The apparatus of claim 1, wherein transmitting the one or more constituent trading orders to the one or more market centers comprises:
transmitting, substantially simultaneously, the one or more constituent trading orders to the one or more market centers for execution.

43. The apparatus of claim 7, wherein the one trading product is the first trading product.

44. The apparatus of claim 8, wherein the one trading product is the first trading product.

45. The apparatus of claim 9, wherein the one trading product is the first trading product.

46. The apparatus of claim 10, wherein the one trading product is the first trading product.

47. The method of claim 13, wherein the market data represent trading conditions in the one or more market centers.

48. The method of claim 13, further comprising:
updating, by the processor, the composite value according to current trading conditions in the one or more market centers.

49. The method of claim 13, wherein the composite value is usable to track the plurality of trading products.

50. The method of claim 13, wherein the composite value is substantially equivalent to a quantity of the first trading product.

51. The method of claim 13, wherein the composite value corresponds to available volumes of the first trading product and the at least one trading product of the plurality of trading products other than the first trading product in the one or more market centers.

52. The method of claim 13, wherein:
the one or more constituent trading orders comprise a first constituent trading order for one trading product of the plurality of trading products and a second constituent trading order for another trading product of the plurality of trading products.

53. The method of claim 52, wherein the one trading product is the first trading product.

54. The method of claim 52, wherein:
the one trading product comprises a note associated with a first maturity; and the another trading product comprises a note associated with a second maturity.

55. The method of claim 54, wherein the one trading product is the first trading product.

56. The method of claim 52, wherein:

the one trading product comprises a particular currency; and the another trading product comprises a futures contract associated with the particular currency.

57. The method of claim 56, wherein the one trading product is the first trading product.

58. The method of claim 52, wherein:

the one trading product comprises a note; and the another trading product comprises a futures contract associated with the note.

59. The method of claim 58, wherein the one trading product is the first trading product.

60. The method of claim 13, further comprising:

retrieving, by the processor, a first trader profile, the first trader profile being associated with the first trader and comprising the one or more stored preferences of the first trader.

61. The method of claim 13, further comprising:

receiving, by the processor, updated market data from the one or more market centers; and wherein determining the one or more new constituent trading orders comprises:

determining the one or more new constituent trading orders based at least in part on the updated market data.

62. The method of claim 61, further comprising:

transmitting, by the processor, on behalf of the first trader, the one or more new constituent trading orders to at least one market center of the one or more market centers.

63. The method of claim 62, further comprising:

monitoring, by the processor, whether the one or more new constituent trading orders are filled successfully in the at least one market center;

determining, by the processor, that at least one new constituent trading order of the one or more new constituent trading orders was not filled successfully;

receiving, by the processor, further updated market data from the one or more market centers; and determining, by the processor, based at least in part on the further updated market data, one or more additional constituent trading orders, wherein the one or more additional constituent trading orders are configured to be substantially equivalent to an unfilled portion of the at least one new constituent trading order.

64. The method of claim 62, further comprising:

continue determining, by the processor, additional constituent trading orders and transmitting, by the processor, the additional constituent trading orders to at least some of the one or more market centers until all constituent trading orders underlying the composite trading order are filled and the composite trading order is satisfied.

65. The method of claim 13, wherein identifying the plurality of trading products further comprises:

for each trading product of the plurality of trading products other than the first trading product:

determining, by the processor, that the trading product is related to the first trading product based in part on relationship data.

66. The method of claim 13, wherein identifying the plurality of trading products further comprises:

identifying, by the processor, the plurality of trading products based at least in part on the one or more stored preferences of the first trader.

67. The method of claim 13, further comprising:

receiving, by the processor, updated market data from the one or more market centers, wherein the updated market data relates to the plurality of trading products.

68. The method of claim 67, wherein receiving the updated market data comprises:

receiving, by the processor, the updated market data from the one or more market centers via at least one of a network and a trading platform.

69. The method of claim 67, wherein determining the one or more constituent trading orders comprises:

determining, by the processor, based at least in part on the updated market data, the one or more constituent trading orders.

70. The method of claim 13, wherein receiving the market data comprises:

receiving, by the processor, the market data from the one or more market centers via at least one of a network and a trading platform.

71. The method of claim 13, wherein transmitting the one or more constituent trading orders comprises:

transmitting, by the processor, the one or more constituent trading orders to the one or more market centers via at least one of a network and a trading platform.

72. The method of claim 13, wherein the market data relates to the availability for trade of the plurality of trading products in the one or more market centers.

73. The method of claim 13, wherein determining the composite value comprises:

determining, by the processor, the composite value based at least in part on the one or more stored preferences of the first trader.

74. The method of claim 13, wherein determining the one or more constituent trading orders comprises:

determining, by the processor, the one or more constituent trading orders based at least in part on the one or more stored preferences of the first trader.

75. The method of claim 13, wherein the at least a portion of the composite value is substantially equivalent to the first quantity of the first trading product.

76. The method of claim 13, further comprising:

receiving, by the processor, the composite trading order for at least the portion of the composite value, wherein receiving the composite trading order comprises:

receiving, by the processor, at least one input from the first trader, wherein the at least one input represents the composite trading order.

77. The method of claim 76, further comprising:

displaying, by the processor, the composite value at a user interface, wherein the user interface is communicatively coupled to the processor.

78. The method of claim 13, further comprising:

generating, by the processor, the composite trading order for at least the portion of the composite value.

79. The method of claim 78, wherein generating the composite trading order comprises:

generating, by the processor, the composite trading order based at least in part on the composite value.

80. The method of claim 79, wherein generating the composite trading order comprises:
  generating, by the processor, the composite trading order based at least in part on the one or more stored preferences of the first trader.

81. The method of claim 78, further comprising:
  displaying, by the processor, the composite trading order at a user interface, wherein the user interface is communicatively coupled to the processor.

82. The method of claim 81, further comprising:
  displaying, by the processor, a message at the user interface, wherein the message indicates that the first trading order cannot be filled from the one or more market centers solely with the first trading product.

83. The method of claim 82, further comprising:
  receiving, by the processor, an input from the first trader, wherein the input is indicative of a decision to submit the composite trading order; and
wherein determining the one or more constituent trading orders comprises:
  determining, by the processor, the one or more constituent trading orders responsively to the input.

84. The method of claim 13, further comprising:
  generating, by the processor, the composite trading order based at least in part on a first preference of the one or more stored preferences of the first trader; and
wherein determining the composite value comprises:
  determining, by the processor, the composite value based at least in part on a second preference of the one or more stored preferences of the first trader and not on the first preference; and
wherein determining the one or more constituent trading orders comprises:
  determining, by the processor, the one or more constituent trading orders based at least in part on a third preference of the one or more stored preferences of the first trader and not on the first preference.

85. The method of claim 13, wherein transmitting the one or more constituent trading orders to the one or more market centers comprises:
  transmitting, by the processor, substantially simultaneously, the one or more constituent trading orders to the one or more market centers for execution.

86. The one or more computer-readable media of claim 14, wherein the market data represent trading conditions in the one or more market centers.

87. The one or more computer-readable media of claim 14, wherein the instructions, when executed, further cause the processor to:
  update the composite value according to current trading conditions in the one or more market centers.

88. The one or more computer-readable media of claim 14, wherein the composite value is usable to track the plurality of trading products.

89. The one or more computer-readable media of claim 14, wherein the composite value is substantially equivalent to a quantity of the first trading product.

90. The one or more computer-readable media of claim 14, wherein the composite value corresponds to available volumes of the first trading product and the at least one trading product of the plurality of trading products other than the first trading product in the one or more market centers.

91. The one or more computer-readable media of claim 14, wherein:
  the one or more constituent trading orders comprise a first constituent trading order for one trading product of the plurality of trading products and a second constituent trading order for another trading product of the plurality of trading products.

92. The one or more computer-readable media of claim 91, wherein the one trading product is the first trading product.

93. The one or more computer-readable media of claim 91, wherein:
  the one trading product comprises a note associated with a first maturity; and
  the another trading product comprises a note associated with a second maturity.

94. The one or more computer-readable media of claim 93, wherein the one trading product is the first trading product.

95. The one or more computer-readable media of claim 91, wherein:
  the one trading product comprises a particular currency; and
  the another trading product comprises a futures contract associated with the particular currency.

96. The one or more computer-readable media of claim 95, wherein the one trading product is the first trading product.

97. The one or more computer-readable media of claim 91, wherein:
  the one trading product comprises a note; and
  the another trading product comprises a futures contract associated with the note.

98. The one or more computer-readable media of claim 97, wherein the one trading product is the first trading product.

99. The one or more computer-readable media of claim 14, wherein the instructions, when executed, further cause the processor to:
  retrieve a first trader profile, the first trader profile being associated with the first trader and comprising the one or more stored preferences of the first trader.

100. The one or more computer-readable media of claim 14, wherein the instructions, when executed, further cause the processor to:
  receive updated market data from the one or more market centers; and wherein determining the one or more new constituent trading orders comprises:
  determining the one or more new constituent trading orders based at least in part on the updated market data.

101. The one or more computer-readable media of claim 100, wherein the instructions, when executed, further cause the processor to:
  transmit, on behalf of the first trader, the one or more new constituent trading orders to at least one market center of the one or more market centers.

102. The one or more computer-readable media of claim 101, wherein the instructions, when executed, further cause the processor to:
  monitor whether the one or more new constituent trading orders are filled successfully in the at least one market center;
  determine that at least one new constituent trading order of the one or more new constituent trading orders was not filled successfully;
  receive further updated market data from the one or more market centers; and
  determine, based at least in part on the further updated market data, one or more additional constituent trading orders, wherein the one or more additional constituent trading orders are configured to be substantially equivalent to an unfilled portion of the at least one new constituent trading order.

103. The one or more computer-readable media of claim 101, wherein the instructions, when executed, further cause the processor to:

continue determining additional constituent trading orders and transmitting the additional constituent trading orders to at least some of the one or more market centers until all constituent trading orders underlying the composite trading order are filled and the composite trading order is satisfied.

104. The one or more computer-readable media of claim 14, wherein identifying the plurality of trading products further comprises:

for each trading product of the plurality of trading products other than the first trading product:
determining that the trading product is related to the first trading product based in part on relationship data.

105. The one or more computer-readable media of claim 14, wherein identifying the plurality of trading products further comprises:

identifying the plurality of trading products based at least in part on the one or more stored preferences of the first trader.

106. The one or more computer-readable media of claim 14, wherein the instructions, when executed, further cause the processor to:

receive updated market data from the one or more market centers, wherein the updated market data relates to the plurality of trading products.

107. The one or more computer-readable media of claim 106, wherein receiving the updated market data comprises:

receiving the updated market data from the one or more market centers via at least one of a network and a trading platform.

108. The one or more computer-readable media of claim 106, wherein determining the one or more constituent trading orders comprises:

determining, based at least in part on the updated market data, the one or more constituent trading orders.

109. The one or more computer-readable media of claim 14, wherein receiving the market data comprises:

receiving the market data from the one or more market centers via at least one of a network and a trading platform.

110. The one or more computer-readable media of claim 14, wherein transmitting the one or more constituent trading orders comprises:

transmitting the one or more constituent trading orders to the one or more market centers via at least one of a network and a trading platform.

111. The one or more computer-readable media of claim 14, wherein the market data relates to the availability for trade of the plurality of trading products in the one or more market centers.

112. The one or more computer-readable media of claim 14, wherein determining the composite value comprises:

determining the composite value based at least in part on the one or more stored preferences of the first trader.

113. The one or more computer-readable media of claim 14, wherein determining the one or more constituent trading orders comprises:

determining the one or more constituent trading orders based at least in part on the one or more stored preferences of the first trader.

114. The one or more computer-readable media of claim 14, wherein the at least a portion of the composite value is substantially equivalent to the first quantity of the first trading product.

115. The one or more computer-readable media of claim 14, wherein the instructions, when executed, cause the processor to:

receive the composite trading order for at least the portion of the composite value, wherein receiving the composite trading order comprises:
receiving at least one input from the first trader, wherein the at least one input represents the composite trading order.

116. The one or more computer-readable media of claim 115, wherein the instructions, when executed, further cause the processor to:

display the composite value at a user interface, wherein the user interface is communicatively coupled to the processor.

117. The one or more computer-readable media of claim 14, wherein the instructions, when executed, cause the processor to:

generate the composite trading order for at least the portion of the composite value.

118. The one or more computer-readable media of claim 117, wherein generating the composite trading order comprises:

generating the composite trading order based at least in part on the composite value.

119. The one or more computer-readable media of claim 118, wherein generating the composite trading order comprises:

generating the composite trading order based at least in part on the one or more stored preferences of the first trader.

120. The one or more computer-readable media of claim 117, wherein the instructions, when executed, further cause the processor to:

display the composite trading order at a user interface, wherein the user interface is communicatively coupled to the processor.

121. The one or more computer-readable media of claim 120, wherein the instructions, when executed, further cause the processor to:

display a message at the user interface, wherein the message indicates that the first trading order cannot be filled from the one or more market centers solely with the first trading product.

122. The one or more computer-readable media of claim 121, wherein the instructions, when executed, further cause the processor to:

receive an input from the first trader, wherein the input is indicative of a decision to submit the composite trading order; and wherein determining the one or more constituent trading orders comprises:

determining the one or more constituent trading orders responsively to the input.

123. The one or more computer-readable media of claim 14, wherein the instructions, when executed, cause the processor to:

generate the composite trading order based at least in part on a first preference of the one or more stored preferences of the first trader; and wherein determining the composite value comprises:

determining the composite value based at least in part on a second preference of the one or more stored preferences of the first trader and not on the first preference; and wherein determining the one or more constituent trading orders comprises:
determining the one or more constituent trading orders based at least in part on a third preference of the one or more stored preferences of the first trader and not on the first preference.

124. The one or more computer-readable media of claim 14, wherein transmitting the one or more constituent trading orders to the one or more market centers comprises:

transmitting, substantially simultaneously, the one or more constituent trading orders to the one or more market centers for execution.

* * * * *